(12) United States Patent
Taylor et al.

(10) Patent No.: US 8,775,791 B2
(45) Date of Patent: Jul. 8, 2014

(54) SYSTEM AND METHOD FOR SECURE MESSAGING BETWEEN WIRELESS DEVICE AND APPLICATION GATEWAY

(75) Inventors: Sean Paul Taylor, Mississauga (CA); Viera Bibr, Kilbride (CA); Brindusa Fritsch, Toronto (CA); Herbert A. Little, Waterloo (CA); Michael Shenfield, Richmond Hill (CA)

(73) Assignee: BlackBerry Limited, Waterloo (CA)

( * ) Notice: Subject to any disclaimer, the term of this patent is extended or adjusted under 35 U.S.C. 154(b) by 1755 days.

(21) Appl. No.: 11/313,942

(22) Filed: Dec. 22, 2005

(65) Prior Publication Data
US 2006/0234731 A1 Oct. 19, 2006

Related U.S. Application Data

(60) Provisional application No. 60/672,040, filed on Apr. 18, 2005.

(51) Int. Cl.
*H04L 29/06* (2006.01)

(52) U.S. Cl.
USPC .................. 713/153; 380/270; 455/466

(58) Field of Classification Search
USPC ........... 713/150, 153, 165, 173; 380/270, 277
See application file for complete search history.

(56) References Cited

U.S. PATENT DOCUMENTS

| | | | | |
|---|---|---|---|---|
| 5,909,491 A * | 6/1999 | Luo | ............................. | 380/270 |
| 2001/0034771 A1 * | 10/2001 | Hutsch et al. | ................. | 709/217 |
| 2002/0131598 A1 | 9/2002 | Chiu | | |
| 2002/0152382 A1 * | 10/2002 | Xiao | ............................. | 713/173 |
| 2003/0051029 A1 * | 3/2003 | Reedy et al. | ................. | 709/224 |
| 2003/0147536 A1 | 8/2003 | Andivahis et al. | | |
| 2003/0185396 A1 * | 10/2003 | Asano et al. | ................. | 380/277 |
| 2004/0114760 A1 * | 6/2004 | Brown et al. | ................. | 380/255 |
| 2004/0193329 A1 | 9/2004 | Ransom et al. | | |
| 2004/0194105 A1 | 9/2004 | Shenfield et al. | | |
| 2005/0201562 A1 * | 9/2005 | Becker et al. | ................. | 380/277 |
| 2005/0285734 A1 * | 12/2005 | Sheynman et al. | ...... | 340/539.21 |
| 2006/0053480 A1 * | 3/2006 | Lacasse et al. | .................... | 726/2 |
| 2006/0126838 A1 * | 6/2006 | Taieb et al. | .................... | 380/229 |

FOREIGN PATENT DOCUMENTS

| | | |
|---|---|---|
| EP | 1 284 570 A | 2/2003 |
| WO | 2004081801 A1 | 9/2004 |

OTHER PUBLICATIONS

PCT International Search Report and Written Opinion mailed Apr. 4, 2006 for corresponding PCT Application No. PCT/CA2005/001963.

* cited by examiner

*Primary Examiner* — Kambiz Zand
*Assistant Examiner* — Suman Debnath
(74) *Attorney, Agent, or Firm* — Perry + Currier Inc.; Kristjan Spence (57) ABSTRACT

A method and system for secure messaging between a wireless device and an application gateway provides for connecting a device to an application mapping layer via a secure socket and exchanging encryption keys for effecting asymmetric encryption between the device and the application gateway. The encryption has a first set of keys for encrypting messages to the device and decryption a second set of keys for decrypting messages from the device. Accordingly, the present patent disclosure provides an entire solution from end-to-end. Combining a variety of security patterns and technologies in a specific manner to provide a highly secure form of protecting data in a messaging style format between two endpoints on a network. The present patent disclosure provides an optimized strength of encryption on the paths from application mapping layer to wireless device and vice versa. And is able to change in nature to suit the dynamic nature of the payload sizes and transmission rates in the mobile market.

14 Claims, 9 Drawing Sheets

SYSTEM AND METHOD FOR SECURE MESSAGING BETWEEN WIRELESS DEVICE AND APPLICATION GATEWAY

This non-provisional application claims benefit of U.S. Provisional Application No. 60/672,040 filed Apr. 18, 2005.

The present patent disclosure relates generally to a communications system for providing communications to a plurality of devices and specifically to a system and method for secure messaging between wireless devices and application gateway.

BACKGROUND OF THE INVENTION

Due to the proliferation of wireless networks, there are a continually increasing number of wireless devices in use today. These devices include mobile telephones, personal digital assistance (PDAs) with wireless communication capabilities, two-way pagers and the like. Concurrently with the increase of available wireless devices, software applications running on such devices have increased their utility. For example, the wireless device may include an application that retrieves a weather report for a list of desired cities or an application that allows a user to shop for groceries. These software applications take advantage of the ability to transmit data of the wireless network in order to provide timely and useful services to users, often in addition to voice communication. However, due to a plethora of different types of devices, restricted resources of some devices, and complexity of delivering large amounts of data to the devices, developing software applications remains a difficult and time-consuming task.

Currently, devices are configured to communicate with Web services through Internet-based browsers and/or native applications. Browsers have the advantage of being adaptable to operate on a cross-platform basis for a variety of different devices, but have a disadvantage of requesting pages (screen definitions in HTML) from the Web service, which hinders the persistence of data contained in the screens. A further disadvantage of browsers is that the screens are rendered at runtime, which can be resource-intensive. Applications for browsers are efficient tools for designing platform independent applications. Accordingly, different runtime environments (RE), regardless of the platform, execute the same application. However, since different wireless devices have different capabilities and form factors, the application may not be executed or displayed as desired. Further, browser based application often require significant transfer bandwidth to operate efficiently, which may be costly or even unavailable for some wireless devices.

On the other hand, native applications are developed for a specific wireless device platform, thereby providing a relatively optimized application program for a runtime environment running on that platform. However, a platform dependent application introduces several drawbacks, including having to develop multiple versions of the same application and being relatively large in size, thereby taxing memory resources of the wireless device. Further, application developers need experience with programming languages such as Java and C++ to construct such native applications.

Systems and methods disclosed herein provide a communication system for provisioning component-based applications on devices to obviate or mitigate at least some of the aforementioned disadvantages.

BRIEF DESCRIPTION OF THE DRAWINGS

An embodiment of the patent disclosure will now be described by way of example only with reference to the following drawings in which.

DETAILED DESCRIPTION OF THE PREFERRED EMBODIMENT

In accordance with an aspect of the present patent disclosure there is provided a system for secure messaging between a wireless device and an application gateway, the system comprising an application gateway server including a message broker for communicating between the system and the device, the application gateway server configured for communication with a provisioning server and a discovery server and including an application mapping layer for effecting asymmetric encryption between the device and the application gateway and including encryption having a first set of keys for encrypting messages to the device and decryption having a second set of keys for decrypting messages from the device.

In accordance with yet another aspect of the present patent disclosure there is provided a method of secure messaging between a wireless device and an application gateway, the method comprising the steps of connecting a device to an application mapping layer via a secure socket; and exchanging encryption keys for effecting asymmetric encryption between the device and the application gateway and including encryption having a first set of keys for encrypting messages to the device and decryption having a second set of keys for decrypting messages from the device.

Accordingly, the present patent disclosure provides an entire solution from end-to-end; combining a variety of security patterns and technologies in a specific manner to provide a highly secure form of protecting data in a messaging style format between two endpoints on a network.

The present patent disclosure provides an optimized strength of encryption on the paths from application mapping layer to wireless device and vice versa. The present patent disclosure is also able to change in nature to suit the dynamic nature of the payload sizes and transmission rates in the mobile market.

Throughout the present patent application we are using RSA (Rivest, Shamir and Adlemean) and ECC (Elliptic Curve Cryptography) as examples of efficient two-way asymmetric algorithms and AES (Advanced Encryption Standard) as an example of a symmetric algorithm.

Figure 1:
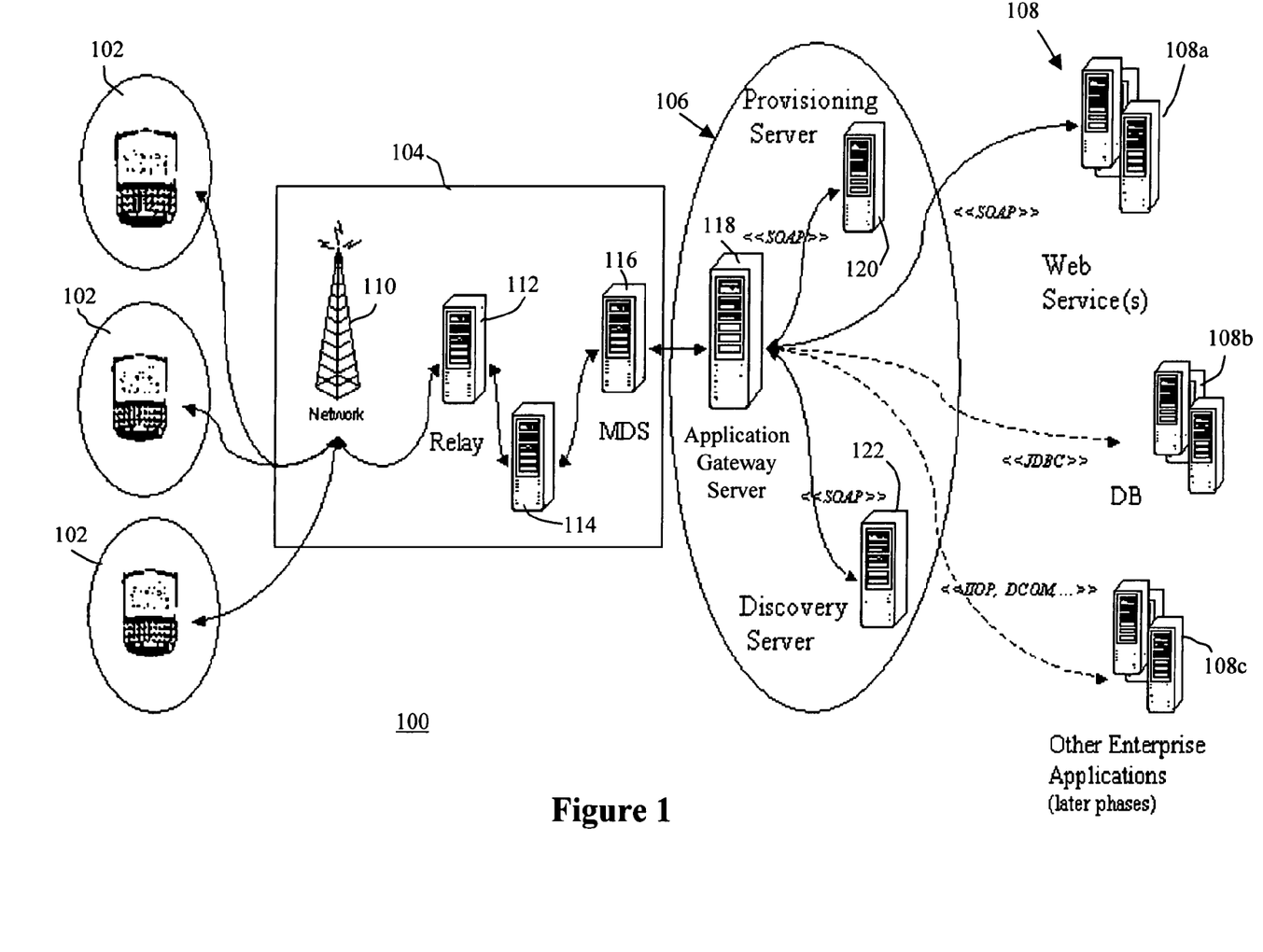
FIG. 1 is block diagram of a network facilitating wireless component applications.

For convenience, like numerals in the description refer to like structures in the drawings. Referring to FIG. 1, a communication infrastructure is illustrated generally by numeral 100. The communication infrastructure 100 comprises a plurality of wireless devices 102, a communication network 104, an application gateway 106, and a plurality of backend services 108.

The wireless devices 102 are typically personal digital assistants (PDAs), such as a Blackberry™ by Research in Motion for example, but may include other devices. Each of the wireless devices 102 includes a runtime environment capable of hosting a plurality of component applications.

Component applications comprise one or more data components, presentation components, and/or message components, which are written in a structured definition language such as Extensible Markup Language (XML) code. The component applications can further comprise workflow components which contain a series of instructions such as written in a subset of ECMAScript, and can be embedded in the XML in some implementations. Therefore, since the applications are compartmentalized, a common application can be written for multiple devices by providing corresponding presentation components without having to rewrite the other components. Further, large portions of the responsibility of typical applications are transferred to the runtime environment for the component applications. The details of the component applications are described at the end of this description.

The wireless devices 102 are in communication with the application gateway 106 via the communication network 104. Accordingly, the communication network 104 may include several components such as a wireless network 110, a relay 112, a corporate server 114 and/or a mobile data server 116 for relaying data between the wireless devices 102 and the application gateway 106.

The application gateway 106 comprises a gateway server 118 a provisioning server 120 and a discovery server 122. The gateway server 118 acts as a message broker between the runtime environment on the wireless devices 102 and the backend servers 108. The gateway server 118 is in communication with both the provisioning server 120 and the discovery server 122. The gateway server 118 is further in communication with a plurality of the backend servers 108, such as Web services 108a, database services 108b, as well as other enterprise services 108c, via a suitable link. For example, the gateway server 118 is connected with the Web services 108a and database services 108b via Simple Object Access Protocol (SOAP) and Java Database Connectivity (JDBC) respectively. Other types of backend servers 108 and their corresponding links will be apparent to a person of ordinary skill in the art.

Each wireless device 102 is initially provisioned with a service book establishing various protocols and settings, including connectivity information for the corporate server 114 and/or the mobile data server 116. These parameters may include a Uniform Resource Locator (URL) for the application gateway server 118. Alternately, if the wireless device 102 is not initially provisioned with the URL and encryption key, they may be pushed to the wireless device 102 via the mobile data server 116. The mobile device 102 can then connect with the application gateway 106 via the URL of the application gateway server 118.

Figure 2:
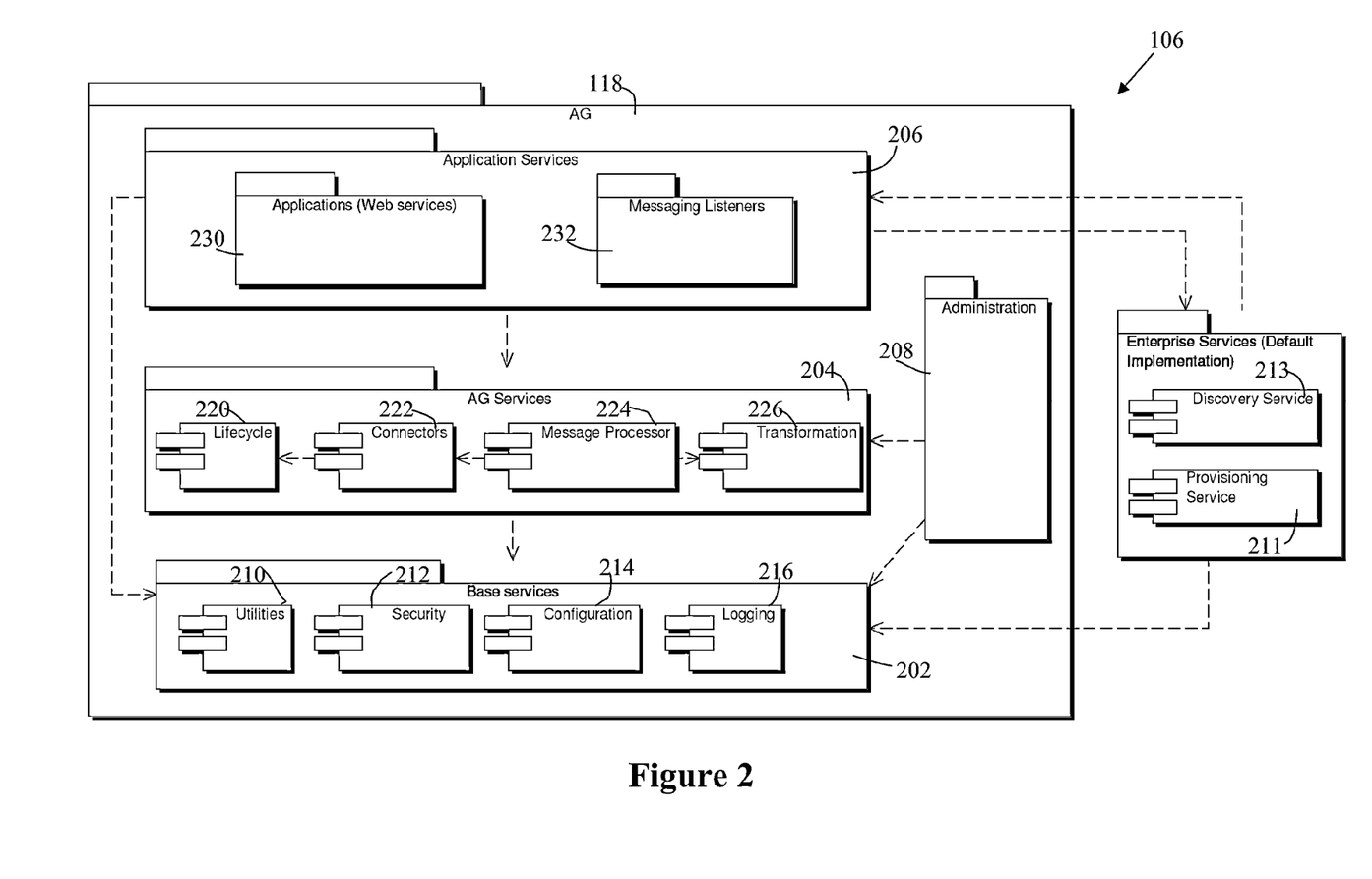
FIG. 2 is a detailed block diagram of the application gateway shown in FIG. 1.

Referring to FIG. 2, a more detailed view of the application gateway 106 is shown. The application gateway server 118 includes three layers of service; a base services layer 202, an application gateway services layer 204 and an application services layer 206. The application gateway server 118 further includes an administration service 208.

A provisioning service 211 and a discovery service 213 are provided by the provisioning server 120 and discovery server 120, respectively At the lowest level, the base services layer 202 offers basic, domain-independent system services to other components in higher levels. Thus, for example, all subsystems in the application gateway services layer 204 and the application services layer 206 can utilize and collaborate with the subsystems in the base services layer 202. In the present embodiment, the base services layer 202 includes a utilities subsystem 211, a security subsystem 213, a configuration subsystem 214, and a logging subsystem 216.

The application gateway services layer 204 provides wireless component application domain specific services. These services provide efficient message transformation and delivery to backend systems 108 and provide wireless device 102 and component application lifecycle management. In the present embodiment, the application gateway services layer 204 includes a lifecycle subsystem 220, a connector subsystem 222, a messaging subsystem 224, and a transformation subsystem 226.

The application services layer 206 sits at the top of the architecture and provides external program interfaces and user interfaces using subsystems provided by the lower layers. For example, various applications such as a service provider lifecycle application, a packaging application and a message listening application provide external program interfaces since they communicate primarily with applications on external systems. Similarly, an administration application provides a user interface by providing a user with the ability to access and potentially modify application gateway data and/or parameters.

The administration service 208 is responsible for administrative system messages, administration of the wireless devices 102, runtime administration of the application gateway subsystems, support and display system diagnostics, and administration of default implementations of the provisioning and discovery services.

The messaging listening application provides an interface for receiving messages from the wireless devices 102 as well as external sources and forwarding them to the messaging subsystem. Further, the message listening application typically authenticates that the source of the message is valid.

The security subsystem 212 providing services used by other subsystems for securing communications with the wireless device 102. In order to facilitate secure communications, the security subsystem 212 encrypts and decrypts messages, validates signatures and signs messages.

Figure 3:
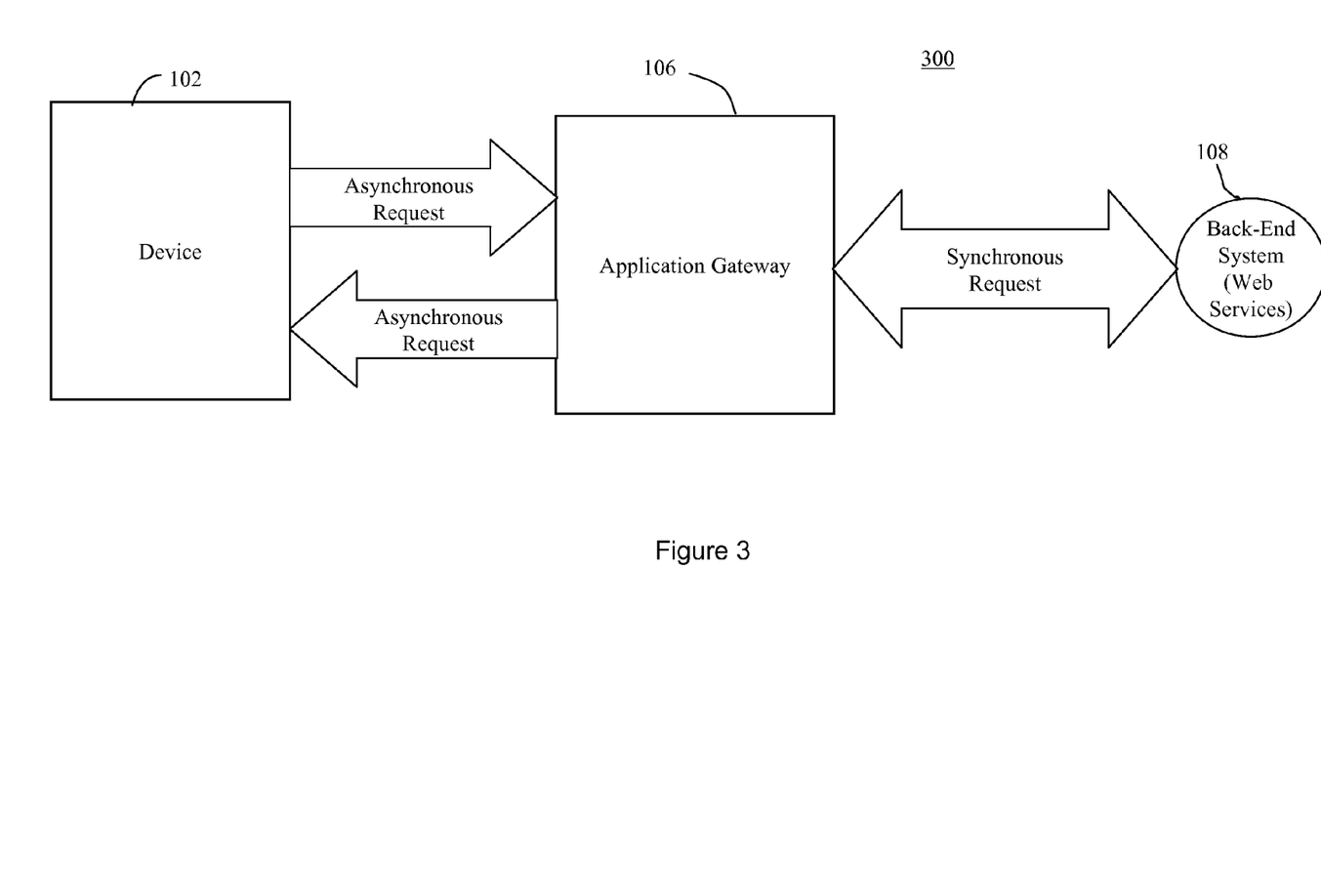
FIG. 3 is a block diagram of a security subsystem.

Referring to FIG. 3, the security subsystem 212 is shown in greater detail. The security subsystem 212 includes a crypto interface 302, a keystore interface 304, and a signature interface 306 for interaction with the subsystems of the application gateway 106. The crypto interface 302 provides functionality allowing encrypting or decrypting messages, received from or sent to the device. The encryption/decryption algorithms are implemented such that the default algorithms can be swapped with new algorithms to change the encryption standards for the whole application gateway 106.

The keystore interface 304 facilitates generating encryption keys and storing and retrieving keys as required.

The signature interface 306 facilitates validating message signatures received as well as signing messages to be transmitted. Similarly to the encryption algorithm, the validation and signature algorithms are can be replaced with different algorithms if desired.

Packaging Application

The packaging application is provided as part of the application 230 for facilitating provisioning of component applications on the wireless devices 102. During a first request for a component application package, the packaging application processes a raw component application, also referred to as a component application bundle, and prepares it for wireless transmission. The packaging application loads the component application bundle from a specified location, typically a predefined URL, determines what security actions and processing it needs to perform, and returns a packaged component application to the provisioning service for storage.

Security actions that may need to occur include, for example, authentication of the component application bundle publisher. Authentication can be achieved by verifying the validity of the publisher's certificate and the using the application gateway signature to sign the packaged component application. Further, a certificate may be generated within a tag by an application development tool and stored within the application bundle; this certificate of the development tool may also be verified.

The component application bundle typically includes modules such as XML definitions, mappings, application resources, and resource bundles for localization support. The XML definitions include XML coding of application data, messages, screen components and workflow. XML is used as an example of any structured definition language applicable to coding of the component applications.

The mappings define the relationship between the component application and one or more backend servers 108. In the present embodiment, the mapping is defined using the Web Services Description Language (WSDL). WSDL is defined in the standard as an XML format for describing network services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate, however, the only bindings described in this document describe how to use WSDL in conjunction with SOAP, HTTP, and Multi-Purpose Internet Mail Extensions (MIME).

Accordingly, when a message is received from the wireless device 102, it includes an identifier illustrating the component application from which it originated. This information is used to identify a corresponding mapping, which determines how to interpret the message as well as where to send it. In the present embodiment, each wireless device 102 in uniquely addressable. Accordingly, return messages are pushed to the device via the mobile data server 116. In alternate embodiments, the push can be achieved via other known carrier/device specific push protocols, as will be appreciated by a person skilled in the art; for example, a Wireless Application Protocol (WAP) push performed over Short Message System (SMS).

The application resources include one or more resources such as images, sound, video and the like, that are packaged with the application as static dependencies. The resource bundles typically include localization information for the component application. An example of localization information includes language support, text direction, scrolling directions, dictionary and thesaurus services and the like.

Accordingly, the processing of the component application bundle includes localization using the provided resource bundle, binary encoding, marking the component application with a secure flag and uploading the packaged component application in a provided destination repository, which is typically designated by URL. In the present embodiment, the binary encoding is performed for reducing the bandwidth required for transmitting the component application to the wireless device 102. The binary encoding is achieved using the Wireless Application Protocol Binary XML (WBXML) standard, although other coding schemes may be used. Yet further, it may not be required to perform binary encoding at all. Further, the mapping is transmitted to the message broker 602 for facilitating communication between the runtime environment executing the component application and the associate backend server or servers 108.

The packaging application is available to external subsystems as a Web service. In the present embodiment, it is accessed by the provisioning service 120, but it may also be accessed by third-party custom provisioning services.

Figure 4:
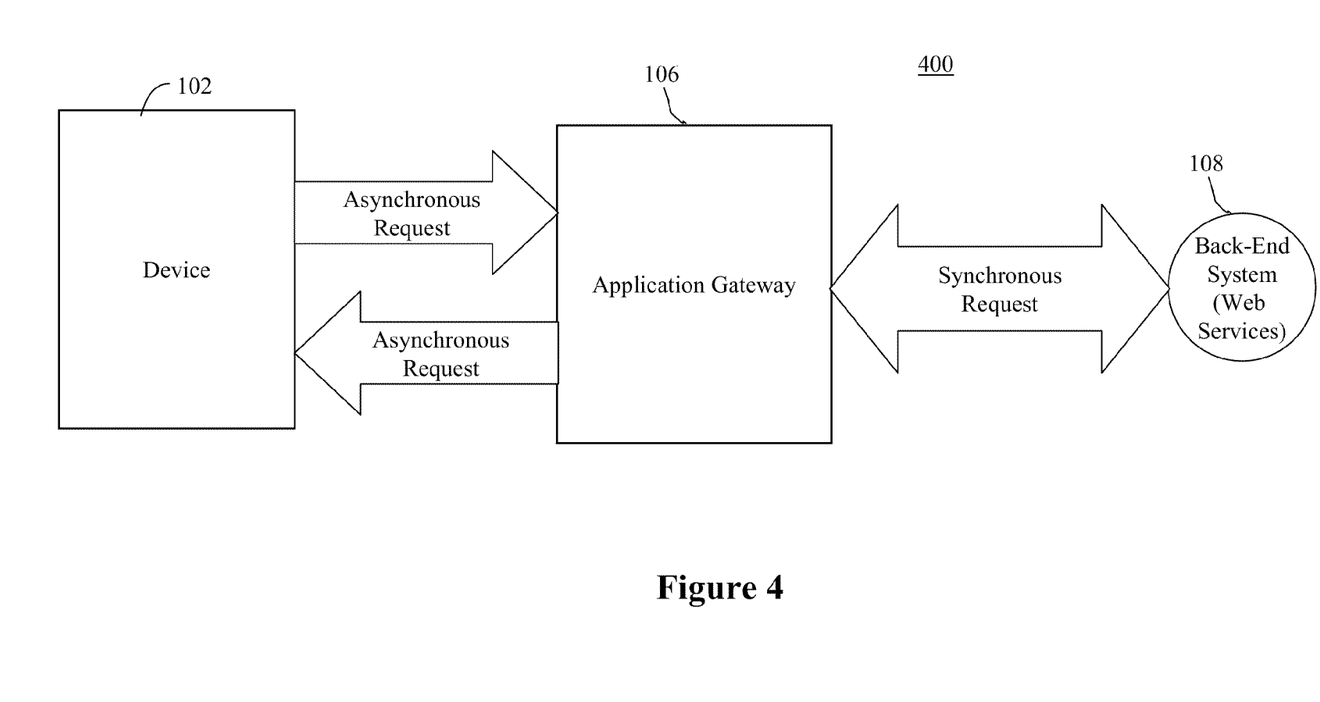
FIG. 4 is a block diagram of a Wireless Component Architecture (WiCA) communication model.

Referring to FIG. 4 there is illustrated in a block diagram a Wireless Component Architecture (WiCA) communication model. From a high-level perspective, the overall WiCA infrastructure 400 includes a WiCA runtime environment (Device RE) running on the device 102 and a WiCA application gateway (AG) 106 running on the server 118.

The Application Gateway (AG) 106 serves as a mediator between a WiCA application (Wiclet) executed by RE 102 and a one or more back-end systems 108 with which the wiclet communicates. In most cases the back-end system(s) 108 is expected to be a Web service using SOAP over HTTP or HTTPS as transport protocol.

The term Web service is used interchangeable with back-end throughout this document since Web services are the most common expected back-end systems. The WiCA communication model 400 is based upon asynchronous messaging paradigm. In this model the application gateway (AG) 106 establishes and mediates the connection between the device 102 and the back-end system(s) 108 to:

1. Achieve greater flexibility in resource management.
2. Provide reliable communication link between device 102 and back-end system 108 to handle situations when wireless coverage is unstable.
3. Efficiently distribute workload between device RE 102 and AG 106.

Figure 5:
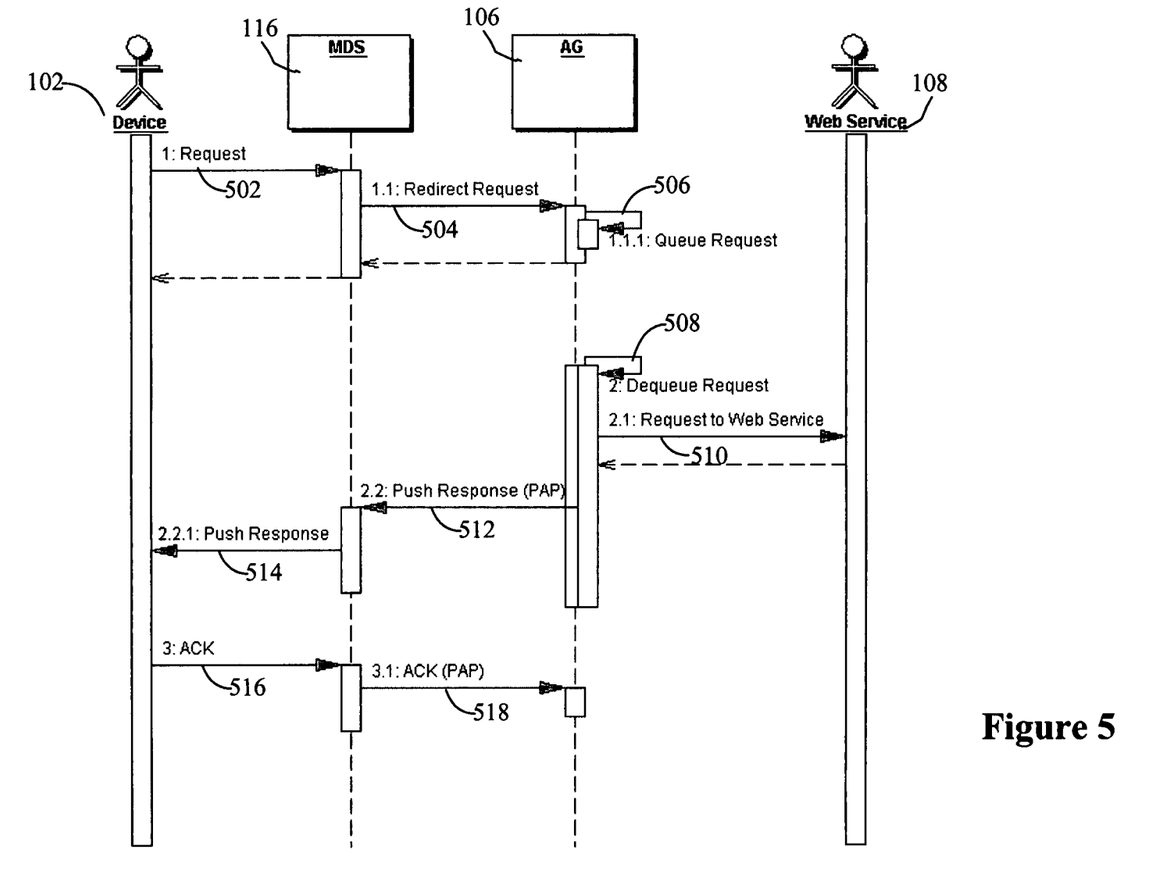
FIG. 5 is a flow diagram of a communication sequence for the WiCA communication model of FIG. 4.

Referring to FIG. 5 there is illustrated in a flow diagram of a communication sequence for the WiCA communication model of FIG. 4. The diagram describes the communications sequence between the device 102 and the back-end system(s) 108:

Upon receiving a request 502 from the device 102, via 504 MDS 116, AG 106 queues the request 506 and releases the connection to the device.

Next, the request is retrieved from the queue 508, preprocessed and forwarded 510 to the Web service 108 through a synchronous communication channel.

Any response from the previous request is processed by AG 106 and a response message is sent asynchronously 512 and 514 back to the device.

Figure 6:
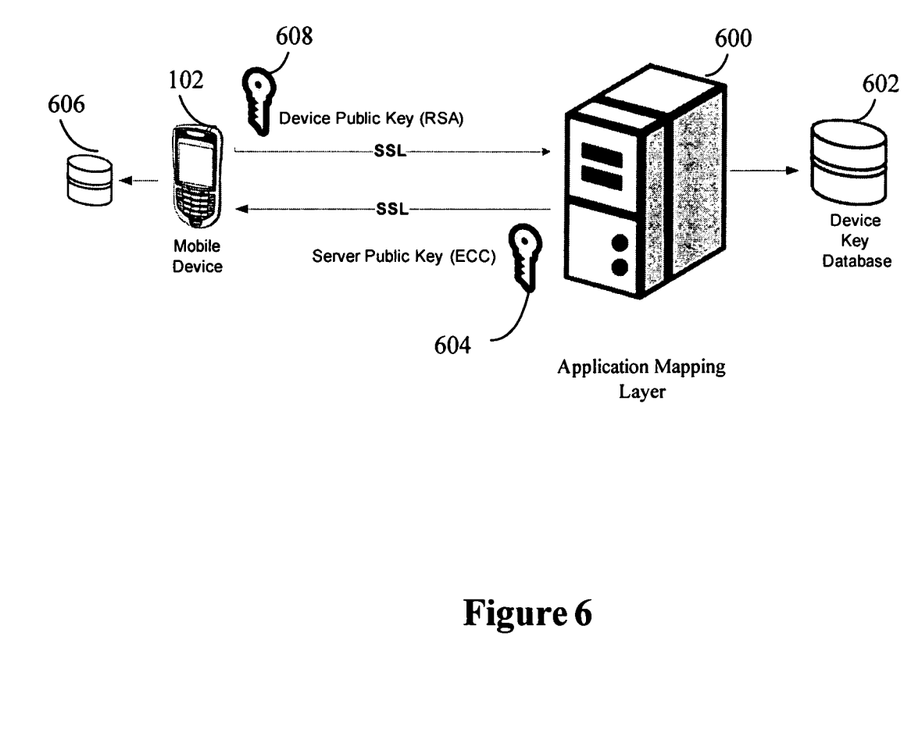
FIG. 6 is a block diagram of a secure handshake in accordance with an embodiment of the present patent disclosure.

Referring to FIG. 6 there is illustrated in a block diagram of a secure handshake in accordance with an embodiment of the present patent disclosure. Application services 206 includes an application mapping layer 600. The application mapping layer 600 has access to a device key database 602 for storing server public keys 604, for example ECC keys. Similarly, the mobile device 102 has a database 606 for storing device public keys 608, for example RSA keys.

Figure 7:
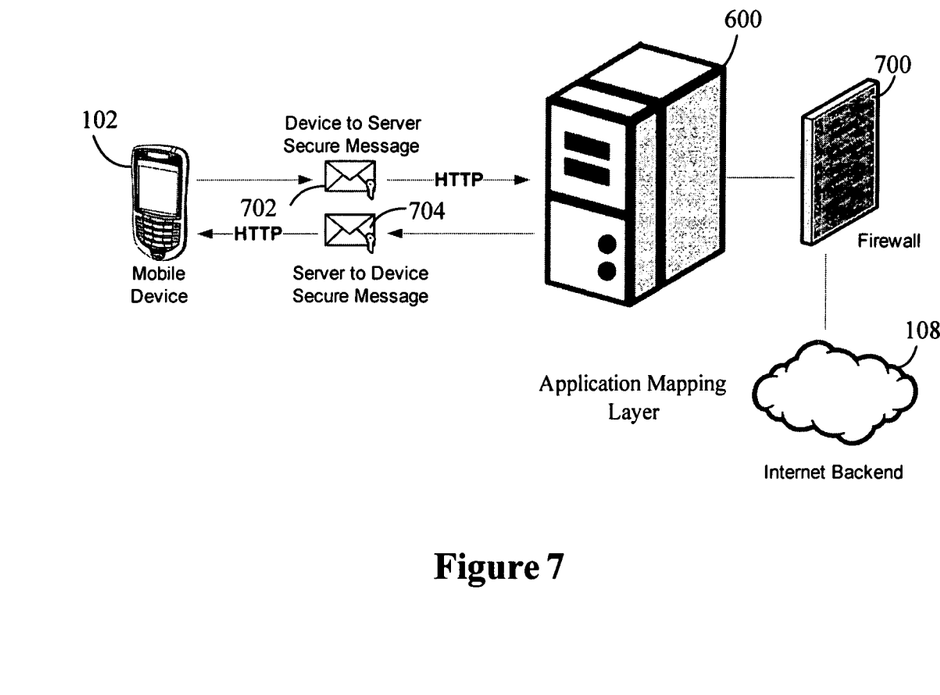
FIG. 7 is a block diagram of a sending a secure message in accordance with an embodiment of the present patent disclosure.

Referring to FIG. 7 there is illustrated in a block diagram of a sending a secure message in accordance with an embodiment of the present patent disclosure. The application mapping layer is shown linked to Web services 108 via a firewall 700.

In operation, once a secure handshake has been established as shown in FIG. 6, a secure message can be sent either from device to server 702 or from server to device 704

The Secure Messaging model supports independent PKI infrastructure schemes in each direction between the Mobile Device (MD) 102 to Application Mapping Layer (AML) 600. This ensures that all messages are sent in the most efficient manner while still providing a secure overall solution. By using asymmetric algorithms one can differentiate in processing costs and time for encrypting versus decrypting depending on the algorithm specification.

RSA is the most commonly used public key cryptosystem. It was developed by Ron Rivest, Adi Shamir and Leonard Adleman in 1977. This algorithm depends on a one-way function involving the factorization of a large integer n. Where n is a product of two large prime numbers, p and q. The one-way function of RSA is to calculate n relatively easily if p and q are known. However, the inverse task of factoring a sufficiently large known n to discover its two prime factors p and q is currently computationally infeasible.

ECC (Elliptic Curve Cryptography) is another public key cryptosystem. Both RSA and ECC can provide secure communications, however, ECC has advantages over RSA and other commonly used public key cryptosystems. RSA is based on the integer factorization problem while ECC is based on the discrete logarithm problem (DLP).

ECC has the following advantages over RSA:
ECC has a shorter key length than any other known public key cryptosystems with similar strength of security. Strength of security is said to be in terms of the time to break the cryptosystem.
ECC is much faster for decryption than is RSA with similar strength of security
ECC is probably more secure than RSA, the largest RSA and ECC challenges solved being 512-bit and 108-bit respectively. The solution to 108-bit ECC challenge is believed to be the largest effort ever expended in a public-key cryptography challenge. It took four months and involved approximately 9,500 machines. The amount of work required to solve the problem was about 50 times than for the 512-bit RSA challenge.
RSA has the following advantage over ECC:
RSA encryption times are faster than for ECC with similar strength of security.

During the handshaking process each side takes the other's public key in trust and uses it to verify data received. These keys are both public keys but may at a later time be switched to a different specification. This processing and over-the-air requirements for the mobile device while assuring adequate strength security.

In the secure handshake, the mobile device (MD) 102 connects to the application mapping layer (AML) 600 via a secure socket layer (SSL) to exchange keys. The SSL ensures trust between the two endpoints during the key transfer process. These keys are persisted in an encoded format on both MD and AML sides for use in all secure message transmissions.

Once exchanged, these public keys play an important role in the securing of data using the following security principles:

Non-Repudiation/Integrity Here proof is needed that the message that was sent has come from the person who you believe it to be from. This is often accomplished using digital signatures, which makes the sender to sign some portion of data with a private key that may be verified with their public key. Integrity exists when it is verified that the message remains the same without modification as when it was sent. This is done with a digital signature that signs all of the data.

Confidentiality is an easy concept for most people to understand. It is the act of keeping secrets. Confidentiality is the process of keeping information from being revealed to entities not intended to receive the information. Encryption is a common and effective way (if used correctly) to provide confidentiality of information.

The secure messaging has a data model that supports two different security modes. Each mode supports different security principles. Depending on the security mode used, the data payload size and performance are affected. Both security modes support data signing and therefore use the public keys 604 and 608 exchanged in the handshake illustrated in FIG. 6.

Figure 8:
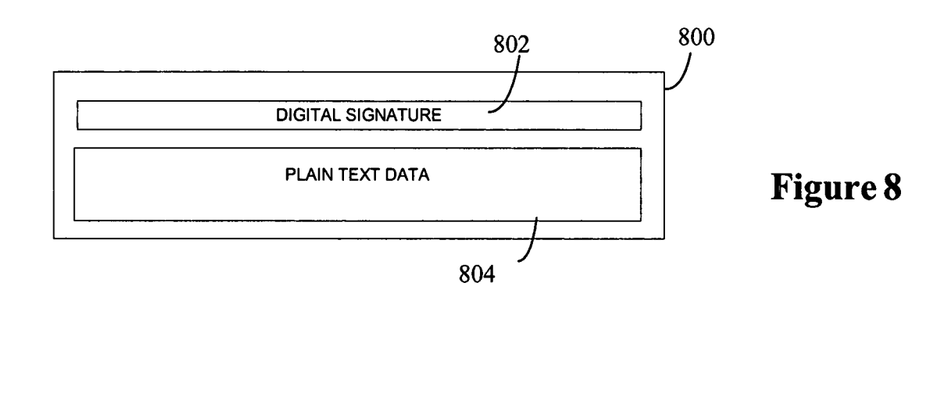
FIG. 8 is a block diagram of a data model for signed mode messaging in accordance with an embodiment of the present patent disclosure.

Referring to FIG. 8 there is illustrated in a block diagram of a data model for signed mode messaging in accordance with an embodiment of the present patent disclosure. The data model 1200 for signed mode security and includes a digital signature 802 and plain text data 804. Signed mode supports the Non-Repudiation/Integrity security principles. This mode is used when you need to be sure that the contents are derived from a know source and the contents have not changed from the time the message was sent until the time the message was received.

Figure 9:
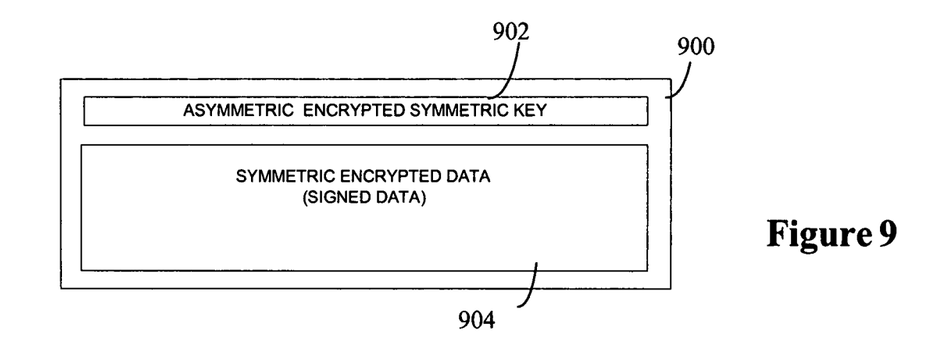
FIG. 9 is a block diagram of a data model for signed and encrypted mode messaging in accordance with an embodiment of the present patent disclosure.

Referring to FIG. 9 is a block diagram of a data model for signed and encrypted mode messaging in accordance with an embodiment of the present patent disclosure. The data model 900 for signed and encrypted mode security and includes an asymmetric encrypted symmetric key 902 and symmetric encrypted data (signed data) 904.

The signed and encrypted mode supports the Non-Repudiation/Integrity and adds Confidentiality. This mode should be used when you need the same security that the signed mode provides, plus you also do not want the signature and plain text data to be visible in the clear. The confidentiality is done using symmetric key technology. In this model, an AES symmetric key is encrypted using the public key exchanged in the handshake. This AES algorithm is used in both directions. Once decrypted it is used as a bulk key to decrypt the signed data contents, which has been ciphered with an AES algorithm.

Figure 10:
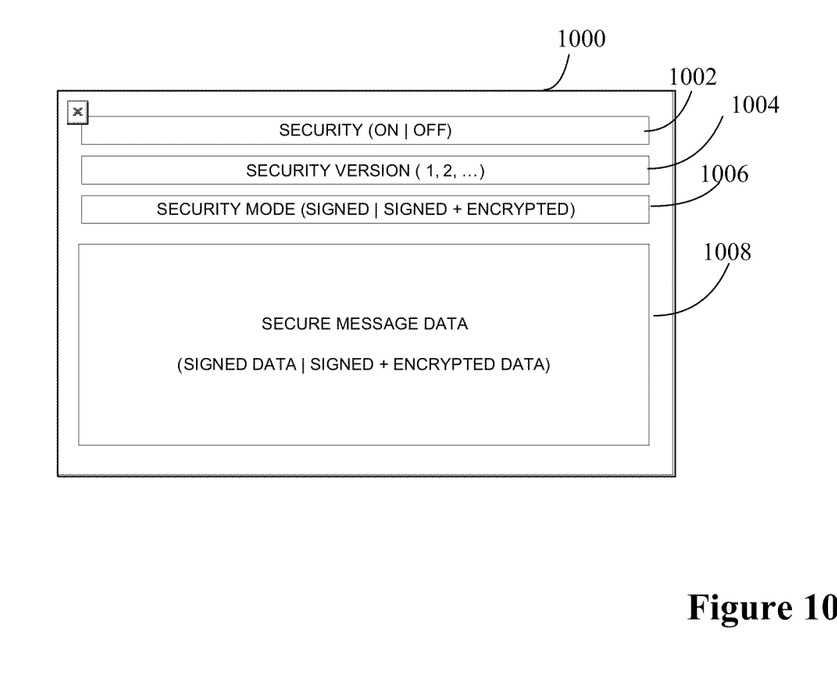
FIG. 10 is a block diagram of a secure message container in accordance with an embodiment of the present patent disclosure.

The secure messaging solution does not dictate the particular transport that should use in sending any type of data between the MD and the AML. The solution inherently allows for applications to send any such data as defined in the data model over any remote protocol. However, it does require some type of message container to define if the messages sent in the container are secure, if so what version they are using and the security mode. Following is the final format of a message containing a secure message Referring to FIG. 10 there is illustrated a block diagram of a secure message container in accordance with an embodiment of the present patent disclosure. The secure message container 1000 includes a security status 1002, a security version 1004, a security mode 1006, and a secured data message 1008.

Numerous modifications, variations and adaptations may be made to the particular embodiments described above without departing from the scope patent disclosure, which is defined in the claims.

What is claimed is:

1. An application gateway for secure messaging with a mobile device, the application gateway comprising:
an application gateway server including a message broker for communicating between a backend server and the mobile device, the application gateway server further configured for effecting independent encryption between the mobile device and the application gateway, including encryption using a first set of keys for encrypting messages to the mobile device and decryption using a second set of keys for decrypting messages from the mobile device, wherein the first set of keys provides different speeds of decryption and encryption at the mobile device than the second set of keys, and wherein the first set of keys is selected to provide faster decryption performance at the mobile device, and the second set of keys is selected to provide faster encryption performance at the mobile device.

2. The application gateway of claim 1, wherein the application gateway server is further configured to effect a secure handshake procedure.

3. The application gateway of claim 1, wherein the application gateway server includes an application mapping layer configured to provide a secure message container.

4. The application gateway of claim 1, wherein the first set of keys comprises elliptic curve cryptography keys.

5. The application gateway of claim 1, wherein the second set of keys comprises RSA keys.

6. The application gateway of claim 1, wherein the encryption of messages sent to the mobile device and the encryption of the messages received from the mobile device are done using different encryption algorithms.

7. A method of secure messaging by an application gateway with a mobile device, the method comprising:
connecting to said mobile device via a secure socket;
exchanging encryption keys with the mobile device for effecting independent encryption between the mobile device and the application gateway server, including a first set of keys for encrypting messages to the mobile device and a second set of keys for decrypting messages from the mobile device, wherein the first set of keys provides different speeds of decryption and encryption at the mobile device than the second set of keys, and wherein the first set of keys is selected to provide faster decryption performance at the mobile device, and the second set of keys is selected to provide faster encryption performance at the mobile device.

8. The method of claim 7, further comprising encrypting a message to the mobile device using the first set of keys and sending the message to the mobile device.

9. The method of claim 8, wherein the sending includes using a secure message container.

10. The method of claim 7, further comprising receiving a message encrypted at the mobile device using the second set of keys.

11. The method of claim 10, wherein the receiving includes using a secure message container.

12. The method of claim 7, wherein the first set of keys comprises elliptic curve cryptography keys.

13. The method of claim 7, wherein the second set of keys comprises RSA keys.

14. The method of claim 7, wherein the encryption of messages sent to the mobile device and the encryption of the messages received from the mobile device are done using different encryption algorithms.

* * * * *